(12) United States Patent
Ha et al.

(10) Patent No.: US 6,697,138 B2
(45) Date of Patent: Feb. 24, 2004

(54) TRANSFLECTIVE LIQUID CRYSTAL DISPLAY DEVICE AND MANUFACTURING METHOD FOR THE SAME

(75) Inventors: Kyoung-Su Ha, Seoul (KR); Jong-Hoon Yi, Seoul (KR)

(73) Assignee: LG Phillips LCD Co., Ltd., Seoul (KR)

( * ) Notice: Subject to any disclaimer, the term of this patent is extended or adjusted under 35 U.S.C. 154(b) by 175 days.

(21) Appl. No.: 10/079,557

(22) Filed: Feb. 22, 2002

(65) Prior Publication Data

US 2002/0113927 A1 Aug. 22, 2002

(30) Foreign Application Priority Data

Feb. 22, 2001 (KR) .......................................... 2001-9027

(51) Int. Cl.[7] ........................ G02F 1/1335; G02F 1/136; G02F 1/1333
(52) U.S. Cl. ........................ 349/114; 349/43; 349/113; 349/106; 349/138
(58) Field of Search ................................. 349/113, 114, 349/43, 138, 106

(56) References Cited

U.S. PATENT DOCUMENTS

| | | | |
|---|---|---|---|
| 6,512,560 B2 * | 1/2003 | Ohtake et al. ............... 349/114 |
| 6,532,045 B2 * | 3/2003 | Chung et al. ................. 349/43 |
| 6,620,655 B2 * | 9/2003 | Ha et al. ..................... 438/149 |
| 2001/0022638 A1 * | 9/2001 | Ha et al. ..................... 349/113 |
| 2002/0063824 A1 * | 5/2002 | Ha et al. ..................... 349/113 |
| 2002/0093609 A1 * | 7/2002 | Baek et al. .................. 349/113 |

* cited by examiner

*Primary Examiner*—Tarifur R. Chowdhury
(74) *Attorney, Agent, or Firm*—Birch, Stewart, Kolasch & Birch, LLP

(57) ABSTRACT

A transflective liquid crystal display device having a first substrate, a gate line and a data line defining a pixel region by crossing each other on the first substrate, a thin film transistor connected to the gate line and the data line, a passivation layer covering the thin film transistor and having a first transmission hole, a reflector disposed on the passivation layer in the pixel region and having a second transmission hole, a color filter formed on the reflector, a pixel electrode made of a transparent conductive material formed on the color filter and connected to the thin film transistor through a contact hole, a second substrate spaced apart from the first substrate, a common electrode formed of a transparent conductive material and disposed beneath the second substrate, and a liquid crystal layer provided between the pixel electrode and the common electrode.

41 Claims, 5 Drawing Sheets

TRANSFLECTIVE LIQUID CRYSTAL DISPLAY DEVICE AND MANUFACTURING METHOD FOR THE SAME

This application claims the benefit of Korean Patent Application No. 2001-09027, filed on Feb. 22, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a transflective liquid crystal (CLC) display device and a method of manufacturing the same.

2. Discussion of the Related Art

Flat panel display devices, which have properties of being thin, and having low weight and low power consumption, have been required as the information age rapidly evolves. The flat panel display device may be classified into two types depending on whether it emits light or not. One is a light-emitting type display device that emits light to display images and the other is a light-receiving display device that uses an external light source to display images. Plasma display panels (PDPs), filed emission display (FED) devices and electro luminescence (EL) display devices are examples of the light-emitting type display devices and liquid crystal displays are an example of the light-receiving type display device. The liquid crystal display device is widely used for notebook computers and desktop monitors, etc. because of its superior resolution, color image display and quality of displayed images.

Generally, the liquid crystal display device has first and second substrates, which are spaced apart and facing each other. Each of the substrates includes an electrode and the electrodes of each substrate are positioned to face each other. A Liquid crystal is interposed between the first substrate and the second substrate. Voltage is applied to the liquid crystal through the electrodes of each substrate, and thus an alignment of the liquid crystal molecules is changed according the applied voltage to display images. Because the liquid crystal display device cannot emit light as described before, it needs an additional light source to display images.

The liquid crystal display device can be classified into two types depending on the type of the light source that is used. One is a transmissive liquid crystal display device and the other is a reflective liquid crystal display device. The transmissive liquid crystal display device displays a color image by irradiating artificial light from a back light, which is positioned behind a liquid crystal panel, to the liquid crystal and then controlling the amount of the light according to the alignment of the liquid crystal. The reflective liquid crystal display device displays a color image by controlling a transmittance of the light according to an alignment of the liquid crystal by reflecting ambient light or artificial light. Because the transmissive liquid crystal display device uses an artificial light source such as the back light, it can display a bright image in dark surroundings but it has a high power consumption. The reflective liquid crystal display device depends on ambient light or an external artificial light source for its light source and accordingly it has lower power consumption than the transmissive liquid crystal display device but it is not suitable for dark surroundings. Accordingly, the transflective liquid crystal display device, which has characteristics of both the transmissive liquid crystal display device and the reflective liquid crystal display device, has been suggested in the field.

FIG. 1 is a cross-sectional view of a conventional transflective liquid crystal display device. As shown in the figure, a pixel electrode 20 is formed on a first substrate 10, referred to as an array substrate, that has a thin film transistor (not shown), i.e., a switching element. The pixel electrode 20 consists of a transmission electrode 21 and a reflection electrode 22. A hole is formed in the reflection electrode 22 and the transmission electrode 21 is formed in the hole. The transmission electrode 21 is formed of transparent conductive material such as indium tin oxide (ITO) or indium zinc oxide (IZO) that has a relatively high transmittance of light. Whereas, the reflection electrode 22 is formed of material such as aluminum (Al) that has a low electric resistance and a high reflectance.

A second substrate 30, i.e., referred to as a color filter substrate, is positioned over the first substrate 10 maintaining a certain distance from the first substrate 10. A color filter 40, which corresponds to the pixel electrode 20, is formed beneath the second substrate 30. The color filter 40 includes sub-color-filters red (R), green (G), and blue (B) and each of the sub-color filters corresponds to each of the pixel electrode 20. A common electrode 50 is formed beneath the color filter 40 using transparent conductive material. A black matrix (not shown) is positioned between the second substrate 30 and the color filter 40 to protect any leakage of light in an area other than the pixel. A liquid crystal layer 60 is positioned between the common electrode 50 and the pixel electrode 20.

A first retardation film 71 and a second retardation film 72 are formed on the outer side of the first substrate 10 and the second substrate 30 respectively. The first retardation film 71 and the second retardation film 72 serve to change the polarization state of light. Because the first and second retardation films 71 and 72 have a phase difference of $\lambda/4$, the first and second retardation films 71 and 72 change linear polarization into circular polarization and circular polarization into linear polarization. A lower polarizer 81 and an upper polarizer 82 are positioned on outer side of the first retardation film 71 and the second retardation film 72, respectively. The light transmission axis of the upper polarizer 82 is perpendicular to the light transmission axis of the lower polarizer 81. A back light 90 is positioned under the lower polarizer 81 and serves as a light source for a transmission mode. The transfective liquid crystal display device is designed on the basis of a reflection mode and thus when a voltage is not applied, the transmittance of the transmission mode is only one-half of the transmittance of the reflection mode. Accordingly, a transflective liquid crystal display device in which the transmittance of the transmission mode is controlled the same as the transmittance of the reflection mode by forming the thickness of a liquid crystal layer of the transmission mode thicker than the thickness of a liquid crystal layer of the reflection mode, has been suggested in the field. The transflective liquid crystal display device is manufactured through a series of process steps like the conventional liquid crystal display device. That is, the manufacturing process for the transflective liquid crystal display device includes a process for producing an array substrate, which includes a plurality of the thin film transistors and pixel electrodes thereon, a process for producing a color filter substrate, which includes the color filter and the common electrode, and a process for producing a liquid crystal cell, which includes such processes as an alignment of the two substrates, an injection of the liquid crystal and sealing and forming the polarizer. The alignment of the array substrate and the color filter substrate is performed as follows. A number of seal patterns are formed on one of the array substrate and the color filter substrate and a number of spacers are dispersed on one of the two substrates to maintain a distance between the two substrates. The two substrates then are aligned in such a way that each of the sub-color filters corresponds to each of the pixel electrode and finally the two substrates are assembled by a pressure hardening of the seal pattern. If a misalignment of the array substrate and the color filter substrate occurs during the alignment process, inferiorities such as a leakage of light may be generated. The width of the black matrix on the second substrate may be formed wide enough to prevent the leakage of light but this tends to lower the aperture ratio of the liquid crystal display device.

SUMMARY OF THE INVENTION

Accordingly, the present invention is directed to a transflective liquid crystal display device and a method of manufacturing the reflective liquid crystal display device that substantially obviates one or more of the problems encountered due to the limitations and disadvantages of the related art.

An advantage of the present invention is to provide a transflective liquid crystal display device in which a color filter is formed on the lower substrate to increase luminance, and the luminance and color purity are controlled uniformly by controlling the thickness of the cell gap and the thickness of the color filter.

Another advantage of the present invention is to provide a method of manufacturing a transflective liquid crystal display device that has a color filter on a lower substrate and a black matrix or a buffer layer on an upper substrate.

Additional features and advantages of the present invention will be set forth in the description which follows, and in part will be apparent from the description, or may be learned by practice of the present invention. The objectives and other advantages of the invention will be realized and attained by the structure particularly pointed out in the written description and the claims herein as well as the appended drawings.

To achieve these and other advantages and in accordance with the purpose of the present invention, as embodied and broadly described, a transflective liquid crystal display device comprises a first substrate, a gate line and a data line defining a pixel region by crossing each other on the first substrate, a thin film transistor connected to the gate line and the data line, a passivation layer covering the thin film transistor and having a first transmission hole, a reflector disposed on the passivation layer in the pixel region and having a second transmission hole, a color filter formed on the reflector, a pixel electrode formed of a transparent conductive material formed on the color filter and connected to the thin film transistor through a contact hole, a second substrate spaced apart from the first substrate, a common electrode formed of a transparent conductive material provided beneath the second substrate, and a liquid crystal layer disposed between the pixel electrode and the common electrode. The pixel electrode may be partially overlapped with the data line and the reflector may be extended to cover the thin film transistor. The second substrate may further include a black matrix that corresponds to the thin film transistor, and a buffer layer, which has a third transmission hole corresponding to the first and second transmission holes, on the common electrode. The first substrate may further include an unevenness that is formed of the same material as the passivation layer in a position corresponding to the first and second transmission holes. The passivation layer may have an unevenness under the reflector. The first substrate may further include an insulating layer that is formed of an organic insulating material on the passivation layer. The transflective liquid crystal display device may further include a gate insulating layer between the gate line and the data line and thus the first and second transmission holes may further extended to the gate insulating layer.

A manufacturing method of a transflective liquid crystal display device comprises the steps of forming a gate line and a data line defining a pixel region by crossing each other on the first substrate; forming a thin film transistor connected to the gate line and the data line; forming a passivation layer covering the thin film transistor and having a first transmission hole; forming a reflector on the passivation layer in the pixel region and having a second transmission hole; forming a color filter on the reflector, forming a pixel electrode on the color filter using transparent conductive material, the pixel electrode being connected to the thin film transistor through a contact hole; forming a common electrode on a second substrate using a transparent conductive material, facing the first substrate and the second substrate toward each other and forming a liquid crystal layer between the pixel electrode and the common electrode. The pixel electrode may be partially overlapped with the data line and the reflector may be extended to cover the thin film transistor. The manufacturing method of the transflective liquid crystal display device may further include a step of forming a black matrix, which corresponds to the thin film transistor, on the second substrate. The manufacturing method of the transflective liquid crystal display device may further include a step of forming a buffer layer, which has a third transmission hole corresponding to the first and second transmission holes, on the second substrate. The step of forming the passivation layer may further include a step of forming unevenness under the reflector. The manufacturing method of the transflective liquid crystal display device may further include a step of forming an insulating layer on the passivation layer using an organic insulating material. The step of forming the passivation layer may further include a step of forming unevenness in a position that corresponds to the first and second transmission holes using the same material as the passivation layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the present invention and are incorporated in and constitute a part of this specification, illustrate embodiments of the present invention and together with the description serve to explain the principles of the invention, wherein.

DETAILED DESCRIPTION OF THE ILLUSTRATED EMBODIMENTS

Reference will now be made in detail to the illustrated embodiment of the present invention, which is shown in the accompanying drawings.

Figure 1:
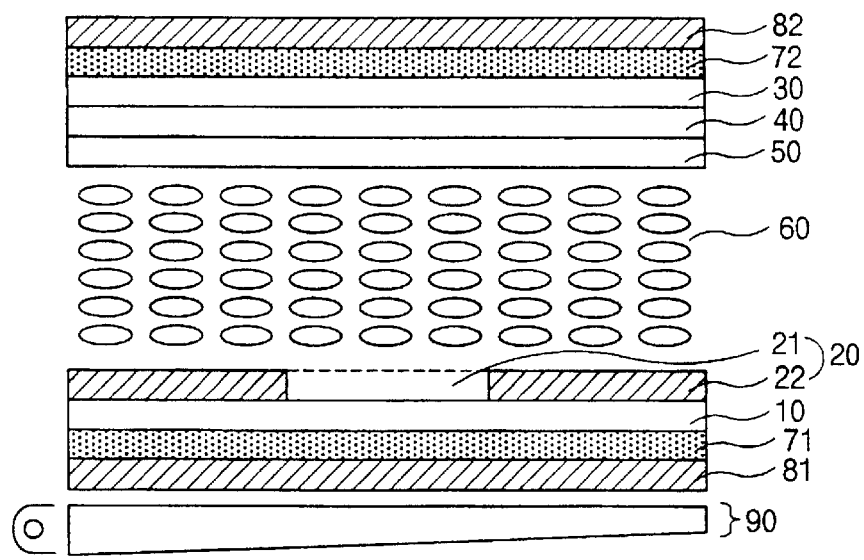
FIG. 1 is a cross-sectional view of a conventional transflective liquid crystal display device.
Figure 2:
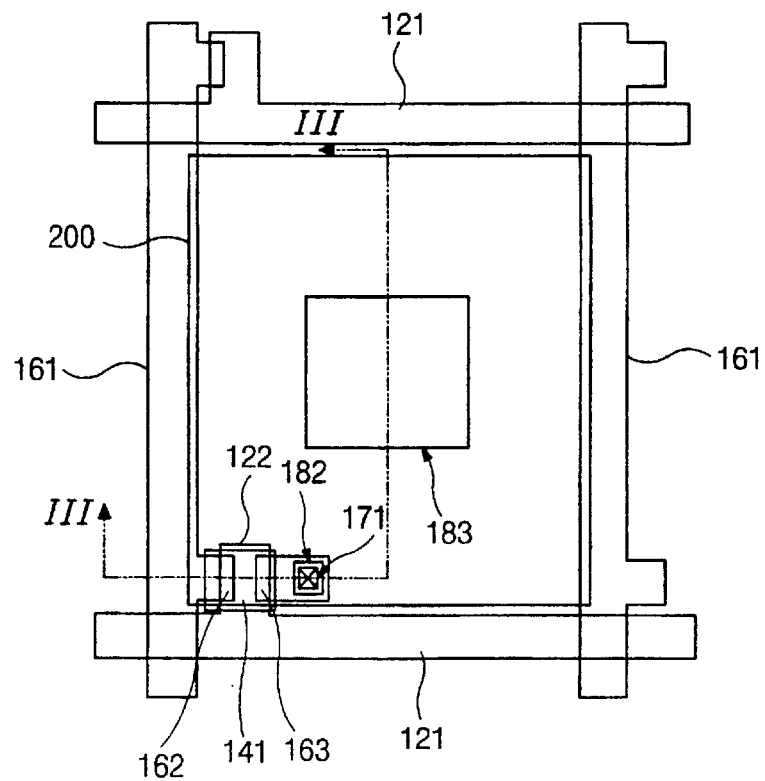
FIG. 2 is a plan view of an array substrate of a transflective liquid crystal display device according to the present invention.
Figure 3:
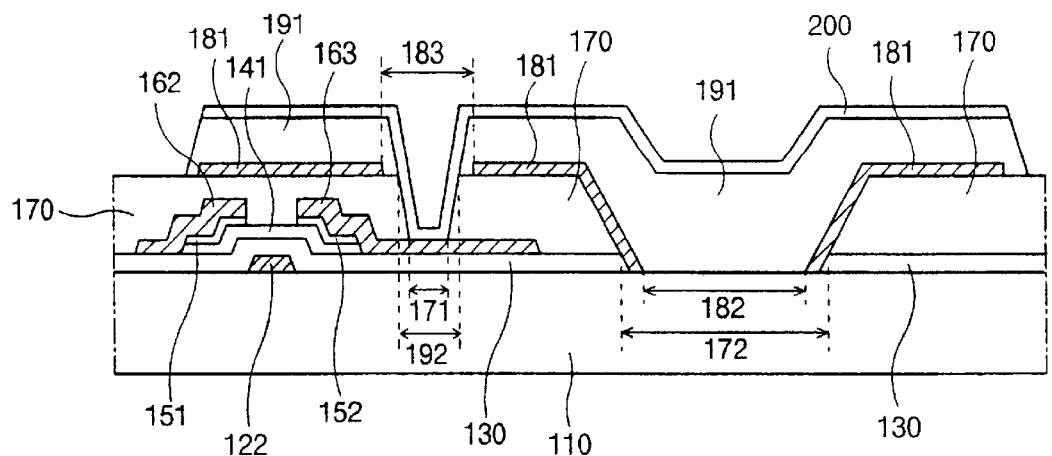
FIG. 3 is a cross-sectional view taken along line III—III of FIG. 2.

FIG. 2 is a plan view of an array substrate of a transflective liquid crystal display device according to the present invention and FIG. 3 is a cross-sectional view taken along line III—III of FIG. 2. An area of a first substrate 110 is divided into a transmission portion and a reflection portion. As shown in FIG. 2 and FIG. 3, a horizontal gate line 121 and a gate electrode 122 that extends from the gate line 121 are formed on a transparent insulating substrate 110 such as glass using conductive material such as metal. A gate insulating layer 130 is formed on the gate line 121 and the gate electrode 122 using an inorganic insulating material such as silicon oxide ($SiO_2$) or silicon nitride ($SiN_x$). An active layer 141 is formed on the gate insulating layer 130 that extends over the gate electrode 122 using an amorphous silicon. Ohmic contact layers 151 and 152 are formed on the active layer 141 using doped amorphous silicon. A data line 161, a source electrode 162 and a drain electrode 163 are formed over the ohmic contact layers 151 and 152 using transparent conductive material such metal. The data line 161 defines a pixel region by crossing the gate line 121, and the source electrode 162 is extended from the data line 161. The drain electrode 163 is spaced apart from the source electrode 162. The gate electrode 122, the source electrode 162 and the drain electrode 163 consist of a thin film transistor. A passivation layer 170 is formed on the data line 161, the source electrode 162 and the drain electrode 163 using an insulating material. Though the passivation layer may be formed of inorganic insulating material such as silicon oxide ($SiO_2$) or silicon nitride ($SiN_x$), it is preferable, for example, to use an organic insulating material such as benzocyclobutene (BCB) or a photosensitive acrylic resin as the passivation layer 170. A first contact hole 171, which exposes the drain electrode 163 to the air, and a first transmission hole 172, which corresponds to the transmission portion, are formed through the passivation layer 170. The first transmission hole 172 is provided for making a difference between the cell gap of the reflection portion and the cell gap of the transmission portion to equalize the luminance of the reflection portion and the luminance of the transmission portion. The first transmission hole 172 may be formed through the gate insulating layer 130 as shown in FIG. 3.

A reflector 181 is formed on the passivation layer 170 in the pixel region. The reflector 181 has a second transmission hole 182 corresponding to the first transmission hole 172 and an opening 183 over the first contact hole 171. The reflector 181 is partially overlapped with the data line 161 with the passivation layer 170 being disposed between the data line 161 and the reflector 181. The reflector 181 may be formed of a conductive material such as aluminum (Al) or an aluminum alloy, which reflects light well, or any other material which reflects light effectively. A color filter 191 is formed on the reflector 181. The color filter 191 consists of sub-color-filters red (R), green (G), and blue (B) and each of the sub-color filters corresponds to each of the pixel regions. The color filter 191 has a hollow portion in the transmission portion due to a step of the first and second transmission holes, and because the color filter 191 is formed of a photoresist resin, the thickness of the transmission potion may be thicker than the thickness of the reflection potion. The color filter 191 has a second contact hole 192, which is connected to the first contact hole 171, over the first contact hole 171. The color filter 191 displays colors and also serves as an insulating layer. A pixel electrode 200 is formed on the color filter 191 using a transparent conductive material such as indium tin oxide (ITO) or indium zinc oxide (IZO). The pixel electrode 200 contacts the drain electrode 163 through the first and second contact holes 171 and 192. The pixel electrode 200 is partially overlapped with the data line 161. Because the color filter 191 serves as an insulating layer, bad influences due to a parasitic capacitance is not generated, even when the pixel electrode 200 is overlapped with the data line 161. Accordingly, the pixel electrode 200 can be formed to be wider than that of the related art. Because the color filter 191 is formed on the first substrate in the present invention, the reflector 181 should be formed under the color filter 191.

Figure 4:
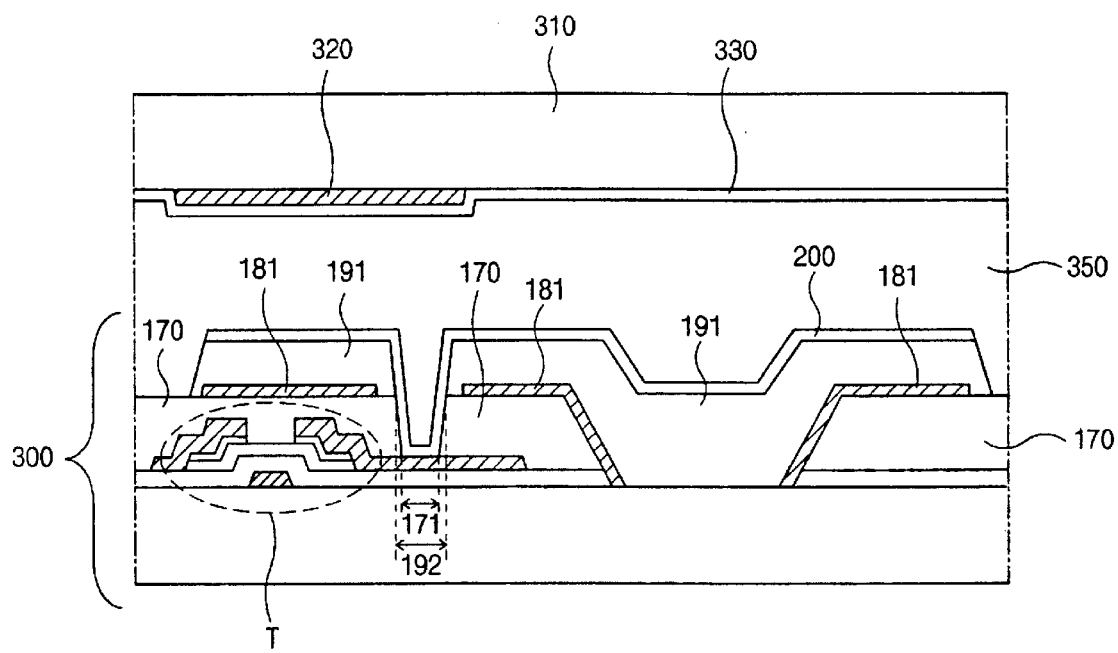
FIG. 4 is a cross-sectional view of a transflective liquid crystal display device according to a first embodiment of the present invention.

FIG. 4 is a cross-sectional view of a transflective liquid crystal display device according to a first embodiment of the present invention. As shown in the figure, a second substrate 310, which is spaced apart from the array substrate 300 and formed of transparent insulating material, is positioned over the array substrate. A black matrix 320 is formed under the second substrate 310. The black matrix 320 is formed only in the region corresponding to the thin film transistor and the first and the second contact holes 171 and 192. The black matrix 320 prevents photoelectric current, which is caused by incident light to a channel region of the thin film transistor, from being generated and prevents leakage of light, which is caused by a change in the alignment of the liquid crystal due to the step of the first and second contact holes 171 and 192, from occurring. A common electrode 330 is formed beneath the black matrix 320 and beneath a whole area of the second substrate 310. The common electrode 330 is formed of transparent conductive material. An alignment film (not shown) is formed on the pixel electrode 200 and beneath the common electrode 330 respectively and a liquid crystal layer 350 is injected between the pixel electrode 200 and the common electrode 330. As shown in the figure, the reflector 181 extends over the thin film transistor "T" in the present invention. Accordingly, because the reflector 181 prevents the light from reaching the channel region of the thin film transistor "T", the black matrix 320 of the second substrate 310 may be omitted. Because the color filter 191 is formed on the first substrate 110, a misalignment between the color filter and the pixel electrode does not occur when assembling the first substrate 110 and the second substrate 310. Accordingly, because the area of the black matrix 320 of the second substrate 310 can be reduced or omitted, the aperture ratio of the liquid crystal display device can be improved. In addition, because the color filter 191 serves as the insulating layer and thus the pixel electrode 200 can be overlapped with the data line 161, the aperture ratio of the liquid crystal display device can further be improved.

Figure 5:
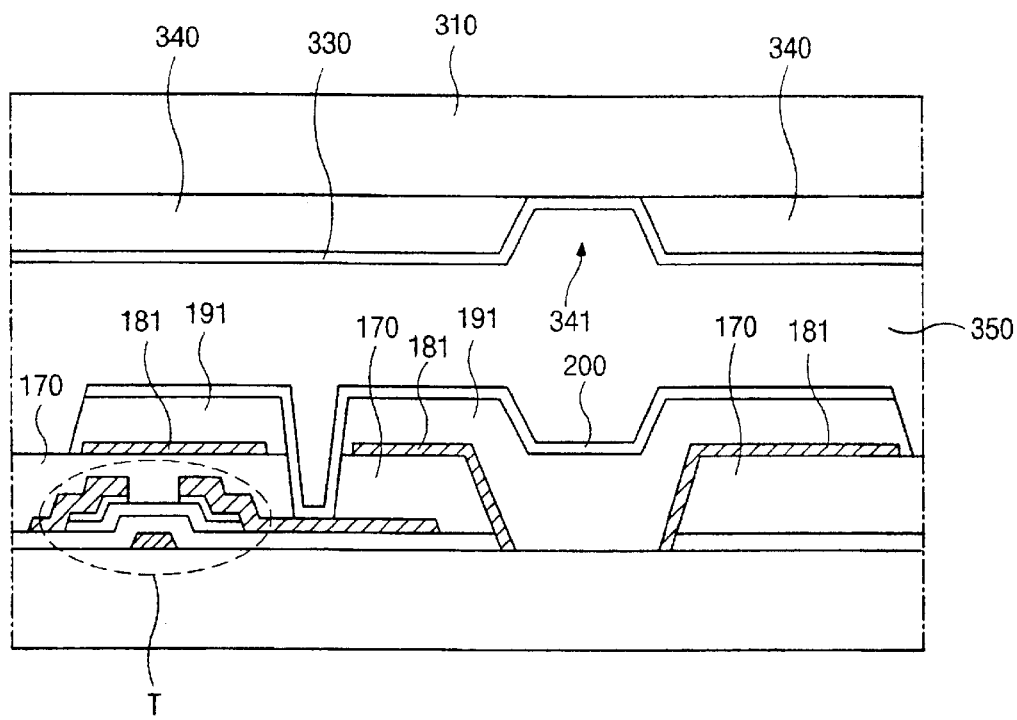
FIG. 5 is a cross-sectional view of a transflective liquid crystal display device according to a second embodiment of the present invention.

FIG. 5 is a cross-sectional view of a transfective liquid crystal display device according to a second embodiment of the present invention. Because the second embodiment of the present invention has substantially the same structure as the first embodiment of the present invention except for an upper substrate, a description of equivalent structure will be omitted. As shown in the figure, the color filter 191 is formed on the first substrate and a buffer layer 340 and a common electrode 330 is sequentially formed under the second substrate 310. The buffer layer 340 is for establishing a cell gap difference between the transmission portion and the reflection portion. That is, because the buffer layer 340 has a third transmission hole 341 corresponding to the transmission portion, the cell gap of the transmission portion is thicker than the cell gap of the reflection portion. It is preferable to form the cell gap of the transmission portion to be twice of the cell gap of the reflection portion and thus the luminance of the reflection portion and the luminance of the transmission portion can be equalized in a transflective liquid crystal display device that is driven in a normally white mode.

Figure 6:
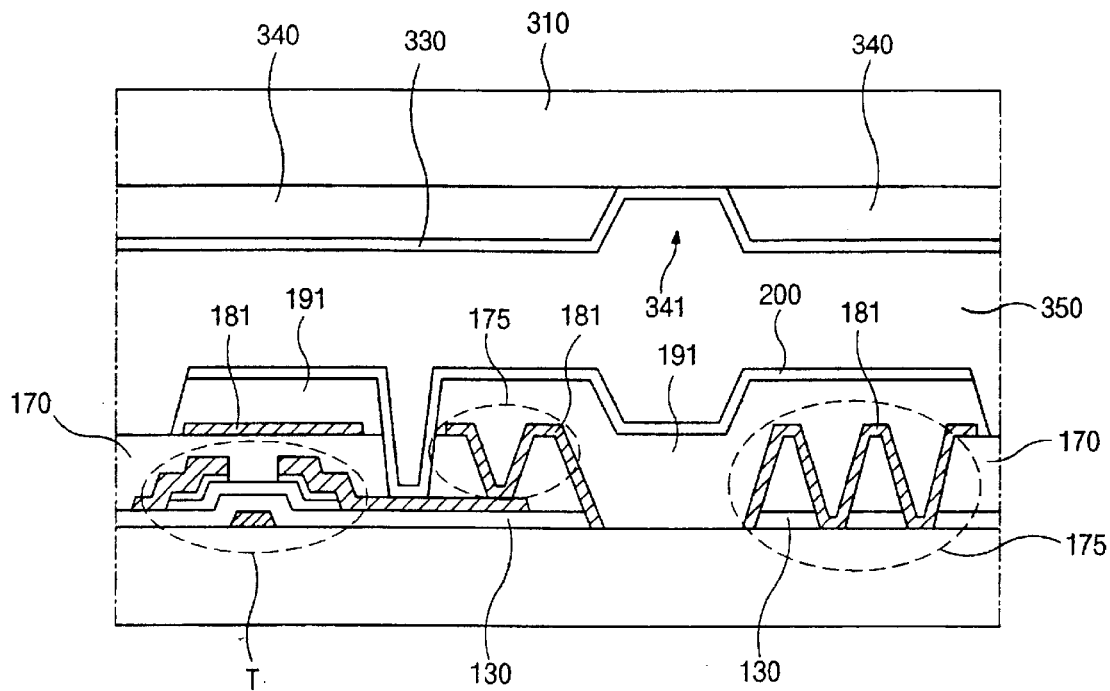
FIG. 6 is a cross-sectional view of a transflective liquid crystal display device according to a third embodiment of the present invention.

FIG. 6 is a cross-sectional view of a transflective liquid crystal display device according to a third embodiment of the present invention. Because the structure of the third embodiment of the present invention is substantially the same as that of the second embodiment except for the passivation layer part, a description on the equivalent structure will be omitted. As shown in the figure, unevenness 175 is formed in the passivation layer 170 of the reflection portion. The unevenness 175 is formed to the gate insulating layer 130 in the figure and it may be formed only in the passivation layer 170. Whereas the light of a reflection mode passes through the color filter 191 twice, light of a transmission mode passes through the color filter 191 only once. Accordingly, a color purity difference between the reflection mode and the transmission mode may occur due to a different degree of coloring. The height of the color filter 191 in the reflection portion is lowered as compared with that of the second embodiment of the present invention because of a hollow portion of the unevenness 175 in the passivation layer 170 of the reflection portion. Accordingly, because the thickness of the color filter 191 in the reflection portion can be reduced as a result, the color purity difference between the transmission portion and the reflection portion can be reduced. Because the thickness of the color filter 191 is controlled by the pattern of the passivation layer 170 to reduce the color purity difference, an additional process is not needed in the present invention.

Figure 7:
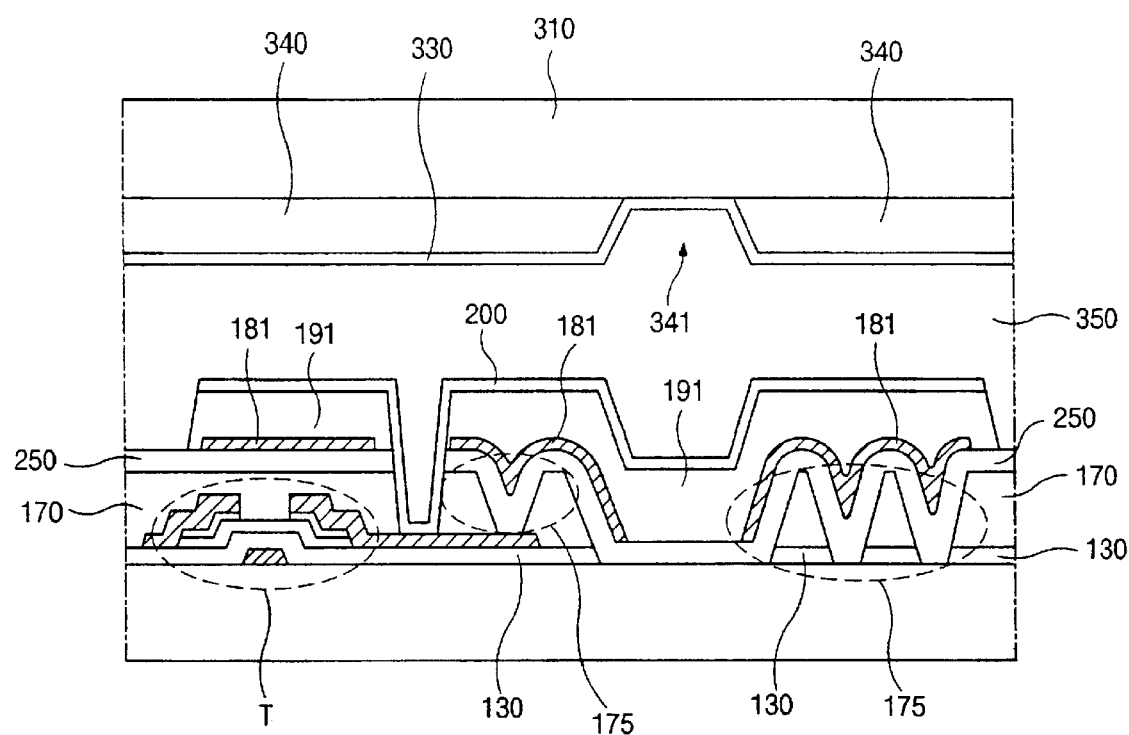
FIG. 7 is a cross-sectional view of a transflective liquid crystal display device according to a fourth embodiment of the present invention.

FIG. 7 is a cross-sectional view of a transflective liquid crystal display device according to a fourth embodiment of the present invention. The fourth embodiment of the present invention is directed to a transflective liquid crystal display device in which the color purity difference is reduced and simultaneously the luminance is increased. As shown in FIG. 6, if the unevenness 175 does not have a proper curved surface when it is formed by patterning the passivation layer 170, the direction of the reflected light is changed and thus the reflected light does not come into sight which may result in a decrease of the luminance. In FIG. 7, an insulating layer 250 is further formed on the passivation layer 170 of the reflection portion where the unevenness 175 is formed, using an organic insulating material such as for example, benzocyclobutene (BCB) or a photosensitive acrylic resin. Because the insulating layer 250 is formed by depositing the fluid organic insulating material and hardening it by heating, the unevenness 175 can develop a proper curved surface. The curved surface increases the amount of the reflected light that comes into sight and thus the luminance of the liquid crystal display device is increased. At this time, the organic insulating material, which is used for the insulating layer 250, is formed using a method such as spin coating and the curved surface of the unevenness can be controlled by varying the speed of revolution of a spin coater or the viscosity of the organic insulating material.

Figure 8:
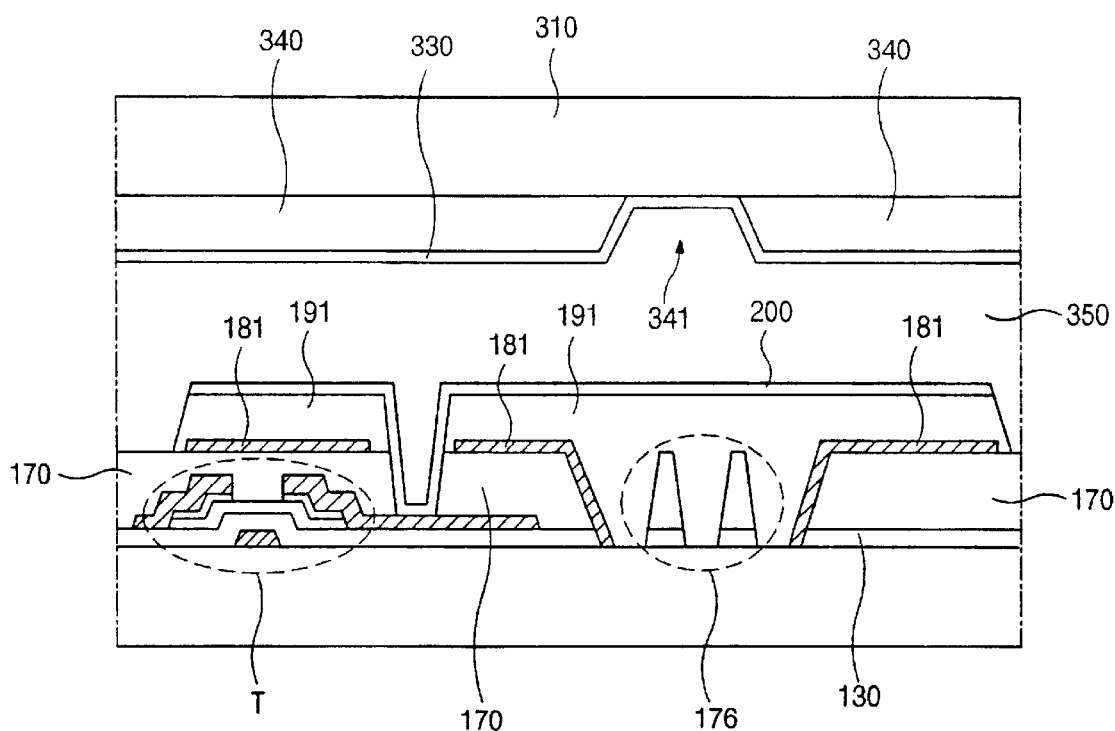
FIG. 8 is a cross-sectional view of a transflective liquid crystal display device according to a fifth embodiment of the present invention.

FIG. 8 is a cross-sectional view of a transflective liquid crystal display device according to a fifth embodiment of the present invention. As shown in the figure, a passivation layer 170 has an unevenness 176 formed in the transmission portion and the top surface of the color filter in the reflection portion and a top surface of the color filter in the transmission portion are formed to be flat. At this time, a convex pattern of the unevenness 176 of the passivation layer 170 formed small and a distance between the convex patterns is formed to be wide, so that most of the color filter thickness in the transmission portion becomes thicker than the color filter thickness in the reflection portion. Accordingly, the color purity difference between the transmission portion and the reflection portion can be decreased. Because the top surface of the array substrate is formed to be flat in the pixel region, it is desirable to obtain an uniform luminance by controlling the cell gap of the transmission portion and the cell gap of the reflection portion by forming the buffer layer 340 on the second substrate 310 and forming the third transmission hole 341 which corresponds to the transmission portion.

As it has been described hereinbefore, the aperture ratio is improved, the luminance of the transmission mode and the luminance of the reflection mode are controlled to be uniform and the color purity difference between the transmission mode and the reflection mode can be decreased without an additional process. In addition, because the color filter 191 is formed on the first substrate, i.e., the lower substrate, the leakage of light, which is caused by the misalignment between the first substrate 110 and the second substrate 310, does not occur and thus the contrast ratio can be increased.

It will be apparent to those skilled in the art that various modifications and variations can be in the fabrication and application of the present invention without departing from the spirit or scope of the invention. Thus, it is intended that the present invention cover the modifications and variations of the present invention provided that they come within the scope of the appended claims and their equivalents.

What is claimed is:

1. A transflective liquid crystal display device, comprising;
    a first substrate;
    a gate line and a data line defining a pixel region by crossing each other on the first substrate;
    a thin film transistor connected to the gate line and the data line;
    a passivation layer covering the thin film transistor and having a first transmission hole;
    a reflector disposed on the passivation layer in the pixel region and having a second transmission hole;
    a color filter formed on the reflector;
    a pixel electrode made of a transparent conductive material formed on the color filter and connected to the thin film transistor through a contact hole;
    a second substrate spaced apart from the first substrate;
    a common electrode formed of a transparent conductive material disposed between the second substrate and the first substrate; and
    a liquid crystal layer disposed between the pixel electrode and the common electrode.

2. The device according to claim 1, wherein the first substrate further contains an uneven configuration that is formed of a same material as the passivation layer and in a position corresponding to the first and second transmission holes.

3. The device according to claim 1, wherein the passivation layer has an uneven configuration under the reflector.

4. The device according to claim 3, wherein the first substrate further includes an insulating layer that is formed of an organic insulating material on the passivation layer.

5. The device according to claim 1, further includes a gate insulating layer between the gate line and the data line and the first and second transmission holes are extended through the gate insulating layer.

6. The device according to claim 1, wherein the pixel electrode is partially overlapped with the data line.

7. The device according to claim 6, wherein the first substrate further includes an uneven configuration that is formed of a same material as the passivation layer in a position corresponding to the first and second transmission holes.

8. The device according to claim 6, wherein the passivation layer has an uneven configuration under the reflector.

9. The device according to claim 8, wherein the first substrate further includes an insulating layer that is formed of an organic insulating material on the passivation layer.

10. The device according to claim 1, wherein the reflector is extended to cover the thin film transistor.

11. The device according to claim 10, wherein the first substrate further includes an uneven configuration that is formed of the same material as the passivation layer in a position corresponding to the first and second transmission holes.

12. The device according to claim 10, wherein the passivation layer has an uneven configuration under the reflector.

13. The device according to claim 12, wherein the first substrate further includes an insulating layer that is formed of an organic insulating material on the passivation layer.

14. The device according to claim 1, wherein the second substrate further includes a black matrix that corresponds to the thin film transistor.

15. The device according to claim 14, wherein the first substrate further includes an uneven configuration that is formed of the same material as the passivation layer in a position corresponding to the first and second transmission holes.

16. The device according to claim 14, wherein the passivation layer has an uneven configuration under the reflector.

17. The device according to claim 16, wherein the first substrate further includes an insulating layer that is formed of an organic insulating material on the passivation layer.

18. The device according to claim 1, wherein the second substrate further includes a buffer layer, which has a third transmission hole corresponding to the first and second transmission holes, on the common electrode.

19. The device according to claim 18, wherein the first substrate further includes an uneven configuration that is formed of the same material as the passivation layer in a position corresponding to the first and second transmission holes.

20. The device according to claim 18, wherein the passivation layer has an uneven configuration under the reflector.

21. The device according to claim 20, wherein the first substrate further includes an insulating layer made of an organic insulating material and formed on the passivation layer.

22. A method of manufacturing a transflective liquid crystal display device, comprising:
forming a gate line and a data line defining a pixel region by crossing each other on a first substrate;
forming a thin film transistor connected to the gate line and the data line;
forming a passivation layer covering the thin film transistor and having a first transmission hole;
forming a reflector on the passivation layer in the pixel region and containing a second transmission hole;
forming a color filter on the reflector;
forming a pixel electrode on the color filter using a transparent conductive material, the pixel electrode being connected to the thin film transistor through a contact hole;
forming a common electrode on a second substrate using a transparent conductive material;
positioning the first substrate and the second substrate to face each other; and
forming a liquid crystal layer between the pixel electrode and the common electrode.

23. The method according to claim 22, further comprising the step of forming the passivation layer having an uneven configuration under the reflector.

24. The method according to claim 23, further including the step of forming an insulating layer on the passivation layer using an organic insulating material.

25. The method according to claim 22, further including the step of forming the passivation layer having an uneven configuration in a position that corresponds to the first and second transmission holes, using the same material as the passivation layer.

26. The method according to claim 22, wherein the pixel electrode may be partially overlapped with the data line.

27. The method according to claim 26, wherein the passivation layer is formed with an uneven configuration under the reflector.

28. The method according to claim 27, further including the step of forming an insulating layer on the passivation layer using an organic insulating material.

29. The method according to claim 26, further including the step of forming the passivation layer having an uneven configuration in a position that corresponds to the first and second transmission holes, using the same material as the passivation layer.

30. The method according to claim 22, wherein the reflector is extended to cover the thin film transistor.

31. The method according to claim 30, wherein the passivation layer is formed with an uneven configuration under the reflector.

32. The method according to claim 31, further including the step of forming an insulating layer on the passivation layer using an organic insulating material.

33. The method according to claim 30, further including the step of forming the passivation layer having an uneven configuration in a position that corresponds to the first and second transmission holes, using the same material as the passivation layer.

34. The method according to claim 22, further including the step of forming a black matrix which corresponds to the thin film transistor, on the second substrate.

35. The method according to claim 34, wherein the passivation layer is formed with an uneven configuration under the reflector.

36. The method according to claim 35, further including the step of forming an insulating layer on the passivation layer using an organic insulating material.

37. The method according to claim 34, further including the step of forming the passivation layer having an uneven configuration in a position that corresponds to the first and second transmission holes, using the same material as the passivation layer.

38. The method according to claim 22, further includes a step of forming a buffer layer, which has a third transmission hole corresponding to the first and second transmission holes, on the second substrate.

39. The method according to claim 38, wherein the passivation layer is formed with an uneven configuration under the reflector.

40. The method according to claim 39, further including the step of forming an insulating layer on the passivation layer using an organic insulating material.

41. The method according to claim 38, further including the step of forming the passivation layer having an uneven configuration in a position that corresponds to the first and second transmission holes, using the same material as the passivation layer.

* * * * *